United States Patent Office 3,353,604
Patented Nov. 21, 1967

3,353,604
TREATMENT OF SUBSURFACE
EARTHEN FORMATIONS
Daniel L. Gibson and Louis H. Eilers, Tulsa, Okla.,
Samuel R. West, Evansville, Ind., and Clare H. Kucera,
Tulsa, Okla., assignors to The Dow Chemical Company, Midland, Mich., a corporation of Delaware
No Drawing. Filed Oct. 13, 1965, Ser. No. 495,673
8 Claims. (Cl. 166—42)

ABSTRACT OF THE DISCLOSURE

An aldehyde polymer which is slowly soluble in water is dispersed therein and injected into a subterranean formation where it enters and at least a portion thereof lodges in the more accessible passageways thereof and, while the polymer is yet largely undissolved and so emplaced, a treating fluid, e.g., fracturing, acidizing, or fluid drive or flooding fluid, which does not contain any appreciable amount of such polymer, is injected into the formation, the earlier emplaced polymer thereby diverting the subsequently injected fluid to less accessible portions of the formation but which polymer, by continued contact with water, later dissolves and is thereafter substantially all removed from the formation.

The invention is a method of treating a subsurface earthen formation penetrated by a well wherein steps are taken to control the direction and extent of penetration of a fluid injected down the well and into the formation during treatment. In water flooding operations for the recovery of fluids and in stimulation of production from fluid-bearing formations, aqueous liquids are usually injected down a well and forced into the formation.

In water flooding, an aqueous fluid is injected down an injection well and forced into the formation in the direction of a production well to move formation fluid toward the production well.

Fracturing of subsurface fluid-bearing formations is commonly practiced for the purpose of stimulating production of a fluid therefrom. Broadly it comprises injecting fluid via a well penetrating the formation to be fractured, at a pressure sufficient to crack open or fracture the formation. Fluids so employed are largely liquid or gas-liquid mixtures usually containing suspended particulate material insoluble in the fluid, at least some of which is lodged in the fractures created to encourage the formation rock along the fractures to remain spaced apart. Fracturing fluids also usually contain additives to inhibit the loss of fluid to a porous formation thereby to aid in building up pressures to the point of fracture. It has also recently become a common practice to include in the fracturing fluid a friction-loss additive for the purpose of reducing friction due to turbulence and encouraging laminar flow thereby lessening power costs and permitting higher rates of injection.

Flow from calcium carbonate-containing formations are often stimulated by acidizing which comprises injecting an aqueous acid solution, almost invariably containing an inhibitor to the attack of acid on metal, down a well penetrating the formation and into contact with the formation whereupon the acid attacks the formaion and etches passageways therein.

A paramount need in water flooding is to maintain adequate fluid communication between an injection well and the fluid in the formation sought to be recovered by the production well.

One of the continuing problems in formation fracturing has been the limited control which could be exercised over the direction and extent of fractures. Consequently fractures often have extended into portions of the formation where fracturing is least desired and leaves other portions, where fracturing is especially desired, substantially unchanged. Frequently fracturing has consisted of extending the already large fractures at the expense of any measurable benefit to the tighter portions of the formation. It also happens during conventional fracturing, that the fractures are extended into water or brine zones and result in impairment of production and damage to the producing formation due to encroachment of water or brine.

In acidizing, a need has long existed for a way of diverting acidizing compositions from those channels which are already of appreciable size to portions of the formation where channels do not exist or are too small to be adequate.

There is, accordingly, a need for diverting a well-treating fluid into those portions of the formation where channels are most needed.

The invention provides an improved method of providing channels in a subsurface earthen formation employing an aqueous fluid whereby the direction and growth of such channels in the formation are guided by admixture with the aqueous fluid of an effective amount of a solid polymer of an aldehyde which is very slowly soluble in water to make a dispersion and, before the polymer has dissolved appreciably, injecting the dispersion down the well and back into the formation at the necessary pressure whereby the aqueous dispersion of polymer is forced into the more accessible or existing channels in the formation, and at least a portion of the polymer is caused to remain lodged therein thereby diverting subsequently injected treating fluid to less accessible portions of the formation to create channels therein, and thereafter maintaining contact of the thus injected aldehyde polymer with water to dissolve and remove at least some of the so lodged polymer from the channels.

The limits of the percent of the aldehyde polymer to disperse in the aqueous liquid is not highly critical. It may be employed in a substantially uniform concentration throughout a treatment or it may be employed in a slug manner, i.e. a high concentration in a relatively few barrels of fluid and then little or none in the balance of the fluid to result in a desired overall amount of emplaced polymer. Between 0.1% and 6.0% by weight of that portion of the aqueous fluid with which the aldehyde polymer is admixed is recommended. Less than about 0.1% may be employed but is less efficacious than somewhat higher concentrations. More than about 6.0% may be employed but such larger concentrations tend to cause some inconvenience in handling, pumping, and proper emplacement in the formation channels. The preferred amount of the polymer to employ is between about 0.15% and 1.0% by weight of the aqueous fluid with which the polymer is admixed.

The aldehyde polymers recommended for use in the practice of the invention are: paraformaldehyde, being soluble in water to the extent of about 37 grams per 100 grams of water (at 18° C.); metaldehyde (being soluble in water to the extent of about 21 grams per 100 grams of water at 25° C.); and trioxane which is a cyclic aldehyde and soluble in water to the extent of about 18 grams per 100 grams at 18° C. Additional characteristics of paraformaldehyde, metaldehyde, and trioxane may be found in the literature, e.g. Organic Chemistry, 3rd ed., by Feiser and Feiser (1956), Reinhold Publishing Company, New York, or in appropriate tables of the current edition of Lange's Handbook of Chemistry, Handbook Publishers, Sandusky, Ohio.

The invention may consist of but one step, viz. injecting an aqueous fluid containing the dispersed aldehyde polymer down a well penetrating a subsurface formation and then resuming conventional practice as in water flooding, fracturing, or acidizing, wherein an aqueous liquid will thereafter be injected as usual. It is recommended that between about 10% and 100% by weight of the aqueous fluid contain between about 0.1 and 6.0% by weight of said polymer.

The preferred way of practicing the invention is to proceed in two steps: (1) inject the fluid containing the aldehyde polymer diverting agent down the well and into the formation at the desired pressure and (2) injecting an aqueous fluid substantially free of diverting agent down the well and into the formation. As a further alternative, the invention may be practiced by repeating the two steps one or more times. Where an aqueous liquid is present in the formation, as is often the case, the emplaced polymer will necessarily come into contact with water present and, in such instance, the treating liquid may be promptly reversed out of the well if desired. However, if no water is present in the formation, the injection fluid is maintained in contact with the polymer for a time sufficient to dissolve at least a substantial portion of it. If desired in any case, a brine or water flush may be provided to aid in dissolving the aldehyde polymer.

It is recommended that at least about 0.1% and preferably between about 0.5 and 1.5% of a gelling agent, desirably guar gum or the like, be admixed with the aqueous fluid and the aldehyde polymer.

Although the character and size of the particles of the aldehyde polymer are not critical, best results are obtained by employing a mixture of about 5% by weight flake and the balance to make 100% of a 5 to 200 mesh powder.

The practice of the invention, as suggested hereinabove, has three principal embodiments applied to formation treatment: in flooding operations wherein an aqueous solution is injected down one or more injection wells; in fracturing; and in acidizing.

In water flooding, pressures sufficiently high to fracture the formation are not ordinarily reached. In accordance with the invention, the polymer is emplaced in existing channels during the first stage and thereby diverts flooding water, injected in a subsequent step, to less accessible channels to sweep along the formation fluid desired to be produced at the production well.

Fracturing in accordance with the invention, of course, requires that fracturing pressures be attained, preferably in the first stage wherein the aldehyde polymer is present and always in the second stage wherein none or substantially none of the aldehyde polymer is present. The first fractures created are temporarily plugged thereby causing subsequent fracturing to occur elsewhere in the formation.

Acidizing according to the invention, may be carried out wherein the pressures attained in both stages are sufficient to fracture or wherein fracturing pressures are not attained in either stage (known as matrix acidizing). The earlier etched channels are temporarily plugged by the aldehyde polymer, as a result of which subsequently injected acid is diverted to portions of the formation where there has been little or no acid attack.

In practicing the invention the solid ingredients including the aldehyde polymer may be premixed with an aqueous fluid or they may be blended thereinto as it is being conveyed to or as it is being pumped down the well.

The following examples illustrate the practice of the invention.

Example 1

A newly completed well located in Lawrence County, Illinois, cased to a depth of 1852 feet with a 4½-inch diameter casing and having an overall depth of 1872 feet, was in need of stimulation of production. The well was treated as follows: 30 barrels of water were pumped down the wellbore raising the pressure to 1200 p.s.i.g. (pounds per square inch gauge) at the well-head. Then 25 barrels of water containing 2526 pounds of 20 to 40 mesh sand were pumped down the wellbore and into the formation until fracturing occurred. 122 barrels of water containing 1029 pounds of 10 to 20 mesh sand were then pumped down the wellbore until fracturing again occurred. Thereafter 59 barrels of water containing 50 pounds of particulated paraformaldehyde and 2526 pounds of 20 to 40 mesh sand dispersed therein in accordance with the invention were pumped down the wellbore and back into the formation attaining above fracturing pressure. This was a concentration of paraformaldehyde of about 0.252% by weight. Fracturing was thereby again accomplished. The well was next flushed out with water. To insure best results the well was then acidized employing 400 gallons of 15% by weight aqueous HCl inhibited by the pressure of about 0.5% by weight of the corrosion inhibitor described in Example 2 of U.S. Patent 3,077,454. This was followed by additional fracturing with water containing alternately 20 to 40 mesh sand and 10 to 20 mesh sand in concentrations of about 0.5 pound per gallon. Then 49 barrels of water containing both (1) 0.5 pound per gallon of 20 to 40 mesh sand and (2) a total of 25 pounds of paraformaldehyde were injected down the well and into the formation at fracturing pressure. This was a concentration of paraformaldehyde of about 0.15% by weight of the aqueous acid solution. The formation was thereafter again fractured employing 10 to 20 mesh sand in water, attaining a fracturing pressure of 2300 p.s.i.g.

The average rate of injection for the entire treatment was 15.4 barrels per minute. A total of 88,872 gallons of water, 22,000 pounds of propping sand, 400 gallons of 15% inhibited hydrochloric acid and 75 pounds of paraformaldehyde were employed in the complete treatment.

Following treatment, the well was put into production and produced at a significantly higher rate than the average rate of production of untreated wells in the same field. After six months of production following the treatment, the rate of production had declined to about the average for the untreated wells in the same field, indicating a need for further treatment according to the invention.

There are set forth hereinafter an account of eight field treatments which are illustrative of the practice of the invention. All the treatments were conducted in a water flood unit field employing at least one injection well and one production well. All the wells treated were located in Illinois.

In each treatment, the details of the total quantities of treating fluid, pounds of sand, injection rate and the like are omitted, each being done in accordance with approved acidizing procedures, wherein fluid communication between an injection well and formation fluid in a water flooding operation is sought to be improved, except that the aldehyde polymer was admixed with portions of the aqueous liquid employed in accordance with the invention.

In each of the eight treatments, the formation was first acidized in two stages by injecting from 500 to 750 gallons of 15% by weight inhibited hydrochloric acid containing about 0.5% by weight of the inhibitor to acid attack prepared according to Example 2 of U.S. Patent 3,077,454. The first stage consisted of injecting about 200 to 250 gallons of the acid containing the amount of paraformaldehyde dispersed therein which is set out in the table. Thereafter the balance of the acid without appreciable paraformaldehyde dispersed therein was injected. There was no intent here to fracture the formation but to acid-etch channels leading from the injection well to the formation fluid in place. By following the procedure described in general hereinabove, the paraformaldehyde was emplaced in the channels earliest formed so that it diverted the subsequently injected acid of the second step to parts of the formation which had not yet been attacked by the acid.

The efficacy of the treatment was measured in two ways: (1) by the difference in the p.s.i. required to inject the acid before the temporary plugging treatment and that required for comparable injection after treatment (the greater the increase the more effective the temporary plug provided); (2) by the difference, following treatment, between the injection rate of water per day into the injection well prior to treatment and that 7 days after the temporary plug had dissolved following treatment (the greater the injection rate following treatment the more effective the treatment). The results of the eight treatments are shown in the following table.

| Identification of Well Treated | Amount of Paraformaldehyde in Pounds | P.s.i. (Absolute) Increase | Injection in BWPD [1] | |
|---|---|---|---|---|
| | | | Before Treatment | 7 Days After Treatment |
| 1 | 201 | 100 | 13 | 195 |
| 2 | 100 | 100 | 10 | 195 |
| 3 | 100 | 100 | 4 | 140 |
| 4 | 100 | 200 | 18 | 210 |
| 5 | 200 | 100 | 1 | 100 |
| 6 | 100 | [2] (N.A.) | 0 | 75 |
| 7 | 100 | 300 | [2] (N.A.) | 120 |
| 8 | 100 | 50 | 1 | 180 |

[1] Barrels of water per day.
[2] N.A. means the figures were not available.

Reference to the table shows that by the practice of the invention, wherein paraformaldehyde was dispersed in the acid solution, the pressure required for injecting the acid solution following the injection of the polymer was definitely increased, thereby showing that the existing channels had temporarily been plugged. Reference to the table also shows that the amount of water which could be injected 7 days after treatment increased up to as much as 180 fold as in well No. 8 or 100 fold as in well No. 5 or from no injection possible to 75 barrels of water per day as in Example 6.

Having described our invention what we claim and desire to protect by Letters Patent is:

1. The method of acidizing a subsurface fluid-bearing formation consisting at least in part of a calcium carbonate-containing rock which comprises injecting down the wellbore and into the formation an aqueous acidic fluid containing dispersed therein an effective amount of an aldehyde polymer selected from the class consisting of paraformaldehyde, metaldehyde and trioxane to serve as a temporary plugging agent of channels in the more accessible parts of the formation and subsequently injecting an aqueous fluid containing little or no aldehyde polymer into the formation, the fluid thereby being diverted to the less accessible portions of the formation.

2. The method of fracturing subsurface fluid-bearing formations penetrated by a wellbore comprising injecting down the wellbore and into the formation an aqueous fluid containing dispersed therein an effective amount of an aldehyde polymer selected from the class consisting of paraformaldehyde, metaldehyde, and trioxane to serve as a temporary plugging agent of channels in the more accessible parts of the formation and subsequently injecting at greater than fracturing pressure an aqueous fluid containing little or no aldehyde polymer into the formation the fluid thereby being diverted to the less accessible portions of the formation.

3. The method of improving communication between at least one injection well and at least one production well in a water flood operation in the production of fluid from said formation comprising injecting down at least one of the injection wells and into the formation an aqueous fluid containing dispersed therein an effective amount of an aldehyde polymer selected from the class consisting of paraformaldehyde, metaldehyde, and trioxane which enters the more accessible channels in the formation to serve as a temporary plugging agent thereof and subsequently injecting an aqueous fluid containing little or no aldehyde polymer into the formation, the fluid thereby being diverted to the less accessible portions of the formation.

4. In a method of treating a formation penetrated by a wellbore wherein an aqueous liquid is injected down the wellbore and into the formation including water flooding, hydraulic fracturing, and acidizing the improvement wherein there is admixed with a portion of said fluid, prior to its being forced into the formation from the wellbore, an effective amount of an aldehyde polymer selected from the class consisting of paraformaldehyde, metaldehyde, and trioxane which enters and temporarily plugs more accessible channels in the formation and there is subsequently injected, prior to dissolution and removal of said polymer, additional aqueous fluid containing little or no aldehyde polymer at least a portion of said additional fluid being diverted by the so emplaced earlier injected polymer to less accessible parts of the formation.

5. The method according to claim 4 wherein the injection of the aqueous solution containing said aldehyde polymer is alternately repeated each repetition being followed by an aqueous fluid containing substantially no aldehyde polymer.

6. The method according to claim 3 wherein that portion of the aqueous fluid containing the aldehyde polymer is between about 10% and about 100% by weight of said aqueous fluid.

7. The method according to claim 4 wherein the amount of said aldehyde polymer employed is between about 0.1% and about 6.0% by weight of said aqueous treating fluid.

8. The method according to claim 7 wherein the amount of said aldehyde polymer employed is between about 0.15% and 1.0% by weight of said aqueous treating fluid.

References Cited

UNITED STATES PATENTS

| | | | |
|---|---|---|---|
| 2,714,929 | 8/1955 | Nowak | 166—33 |
| 2,792,893 | 5/1957 | Keller | 166—33 |
| 3,259,190 | 7/1966 | Parsons | 166—42 |

CHARLES E. O'CONNELL, Primary Examiner.

NILE C. BYERS, Examiner.

UNITED STATES PATENT OFFICE
CERTIFICATE OF CORRECTION

Patent No. 3,353,604　　　　　　　　　　　　　November 21, 1967

Daniel L. Gibson et al.

It is hereby certified that error appears in the above numbered patent requiring correction and that the said Letters Patent should read as corrected below.

Column 6, line 35, beginning with "5. The method accordin strike out all to and including "polymer.", in line 40, same column 6, and insert instead the following:

5. The method of treating a subsurface fluid-bearing formation penetrated by a wellbore comprising (1) injecting down the wellbore and into the formation an aqueous fluid containing, dispersed therein, a small but effective amount of an aldehyde polymer selected from the class consisting of paraformaldehyde, metaldehyde, and trioxane to serve as a temporary plugging agent of channels in the more accessible parts of the formation and (2) subsequently injecting an aqueous fluid containing little or no aldehyde polymer into the formation, the subsequently injected fluid thereby being diverted to the less accessible portions of the formation, and thereafter repeating the injection of the aqueous solution containing said aldehyde polymer, each repetition being followed by alternately injecting an aqueous fluid containing substantially no aldehyde polymer.

Signed and sealed this 28th day of January 1969.

(SEAL)
Attest:

EDWARD M. FLETCHER, JR.　　　　　　　　　　　EDWARD J. BRENNER
Attesting Officer　　　　　　　　　　　　　Commissioner of Patents